United States Patent
Safford et al.

(10) Patent No.: US 7,237,144 B2
(45) Date of Patent: Jun. 26, 2007

(54) OFF-CHIP LOCKSTEP CHECKING

(75) Inventors: Kevin David Safford, Fort Collins, CO (US); Donald Charles Soltis, Jr., Fort Collins, CO (US); Eric Richard Delano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 10/818,994

(22) Filed: Apr. 6, 2004

(65) Prior Publication Data

US 2005/0240810 A1 Oct. 27, 2005

(51) Int. Cl.
*G06F 11/00* (2006.01)

(52) U.S. Cl. ............................. 714/11; 714/12; 714/49

(58) Field of Classification Search .................. 714/11, 714/12, 49
See application file for complete search history.

(56) References Cited

U.S. PATENT DOCUMENTS

| | | | |
|---|---|---|---|
| 4,785,453 A | 11/1988 | Chandran et al. | |
| 5,226,152 A | 7/1993 | Klug et al. | |
| 5,276,823 A * | 1/1994 | Cutts et al. ................... | 714/11 |
| 5,434,997 A | 7/1995 | Landry et al. | |
| 5,764,660 A | 6/1998 | Mohat et al. | |
| 5,948,111 A | 9/1999 | Taylor et al. | |
| 6,065,135 A | 5/2000 | Marshall et al. | |
| 6,247,144 B1 | 6/2001 | Macias-Garza et al. | |
| 6,393,582 B1 * | 5/2002 | Klecka et al. ................. | 714/11 |
| 6,473,869 B2 * | 10/2002 | Bissett et al. ................. | 714/12 |
| 6,604,177 B1 | 8/2003 | Kondo et al. | |
| 6,615,366 B1 * | 9/2003 | Grochowski et al. .......... | 714/10 |
| 6,625,749 B1 * | 9/2003 | Quach .......................... | 714/10 |
| 6,751,698 B1 * | 6/2004 | Deneroff et al. ............. | 710/317 |
| 6,820,213 B1 * | 11/2004 | Somers et al. ................. | 714/11 |
| 7,055,060 B2 * | 5/2006 | Nguyen et al. ................ | 714/11 |
| 2002/0073357 A1 * | 6/2002 | Dhong et al. .................. | 714/19 |
| 2002/0144177 A1 | 10/2002 | Kondo et al. | |
| 2002/0152418 A1 * | 10/2002 | Griffin et al. .................. | 714/11 |
| 2002/0152420 A1 * | 10/2002 | Chaudhry et al. ............. | 714/11 |
| 2003/0005380 A1 * | 1/2003 | Nguyen et al. ............. | 714/736 |

FOREIGN PATENT DOCUMENTS

| | | |
|---|---|---|
| EP | 0201356 B1 | 11/1986 |
| WO | WO94/08293 | 9/1993 |
| WO | WO 02/084490 | 10/2002 |

OTHER PUBLICATIONS

Search Report from France dated Jan. 12, 2006.

\* cited by examiner

*Primary Examiner*—Gabriel Chu

(57) ABSTRACT

A system is provided which includes a microprocessor comprising a first processing unit to generate a first output signal and a second processing unit to generate a second output signal, and comparison means, coupled to the microprocessor, to detect whether the first output signal differs from the second output signal.

33 Claims, 5 Drawing Sheets

OFF-CHIP LOCKSTEP CHECKING

CROSS-REFERENCE TO RELATED APPLICATIONS

This application is related to the following commonly-owned and concurrently-filed U.S. Patent Applications, which are hereby incorporated by reference:

"Core-Level Processor Lockstepping," Ser. No. 10/818,975.

"Lockstep Error Signaling," Ser. No. 10/818,993.

"Voltage Modulation for Increased Reliability in an Integrated Circuit," Ser. No. 10/818,974.

"Architectural Support for Selective Use of a High-Reliability Mode in a Computer System," Ser. No. 10/819,241.

BACKGROUND

The present invention relates to microprocessor design and, more particularly, to techniques for implementing microprocessor lockstepping.

Cosmic rays or alpha particles that strike a silicon-based device, such as a microprocessor, can cause an arbitrary node within the device to change state in unpredictable ways, thereby inducing what is referred to as a "soft error." Microprocessors and other silicon-based devices are becoming increasingly susceptible to soft errors as such devices decrease in size. Soft errors are transient in nature and may or may not cause the device to malfunction if left undetected and/or uncorrected. An uncorrected and undetected soft error may, for example, cause a memory location to contain an incorrect value which may in turn cause the microprocessor to execute an incorrect instruction or to act upon incorrect data.

One response to soft errors has been to add hardware to microprocessors to detect soft errors and to correct them, if possible. Various techniques have been employed to perform such detection and correction, such as adding parity-checking capabilities to processor caches. Such techniques, however, are best at detecting and correcting soft errors in memory arrays, and are not as well-suited for detecting and correcting soft errors in arbitrary control logic, execution datapaths, or latches within a microprocessor. In addition, adding circuitry for implementing such techniques can add significantly to the size and cost of manufacturing the microprocessor.

One technique that has been used to protect arbitrary control logic and associated execution datapaths is to execute the same instruction stream on two or more processors in parallel. Such processors are said to execute two copies of the instruction stream "in lockstep," and therefore are referred to as "lockstepped processors." When the microprocessor is operating correctly (i.e., in the absence of soft errors), all of the lockstepped processors should obtain the same results because they are executing the same instruction stream. A soft error introduced in one processor, however, may cause the results produced by that processor to differ from the results produced by the other processor(s). Such systems, therefore, attempt to detect soft errors by comparing the results produced by the lockstepped processors after each instruction or set of instructions is executed in lockstep. If the results produced by any one of the processors differs from the results produced by the other processors, a fault is raised or other corrective action is taken. Because lockstepped processors execute redundant instruction streams, lockstepped systems are said to perform a "functional redundancy check."

One difficulty in the implementation of lockstepping is that it can be difficult to provide clock signals which are precisely in phase with each other and which share exactly the same frequency to a plurality of microprocessors. As a result, lockstepped processors can fall out of lockstep due to timing differences even if they are otherwise functioning correctly. In higher-performance designs which use asynchronous interfaces, keeping two different processors in two different sockets on the same clock cycle can be even more difficult.

Early processors, like many existing processors, included only a single processor core. A "multi-core" processor, in contrast, may include one or more processor cores on a single chip. A multi-core processor behaves as if it were multiple processors. Each of the multiple processor cores may essentially operate independently, while sharing certain common resources, such as a cache or system interface. Multi-core processors therefore provide additional opportunities for increased processing efficiency. In some existing systems, multiple cores within a single microprocessor may operate in lockstep with each other.

SUMMARY

A system is provided which includes a microprocessor comprising a first processing unit to generate a first output signal and a second processing unit to generate a second output signal, and comparison means, coupled to the microprocessor, to detect whether the first output signal differs from the second output signal.

Other features and advantages of various aspects and embodiments of the present invention will become apparent from the following description and from the claims.

DETAILED DESCRIPTION

Figure 1:
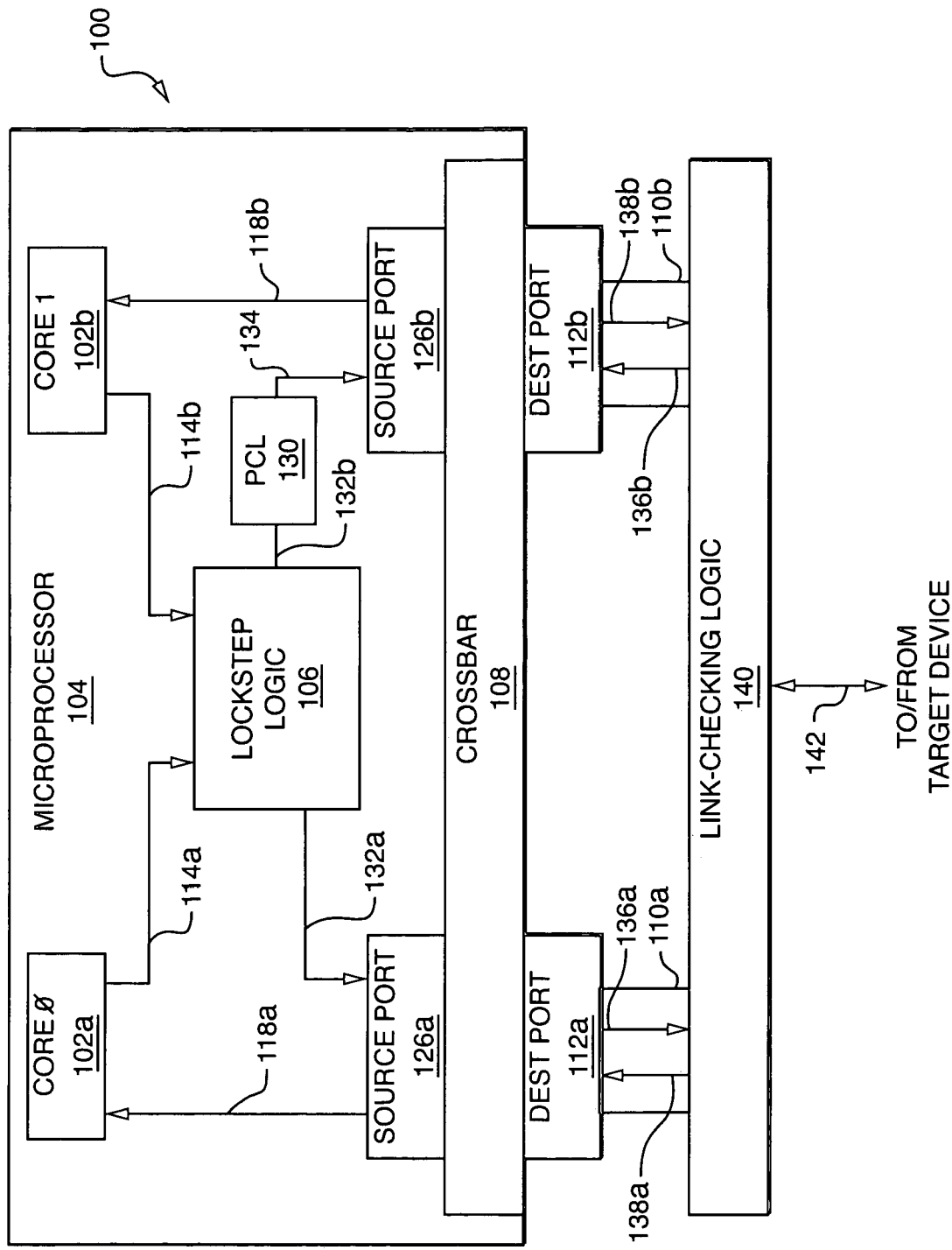
FIG. 1 is a block diagram of a system for operating multiple processor cores in lockstep according to one embodiment of the present invention.
Figure 2:
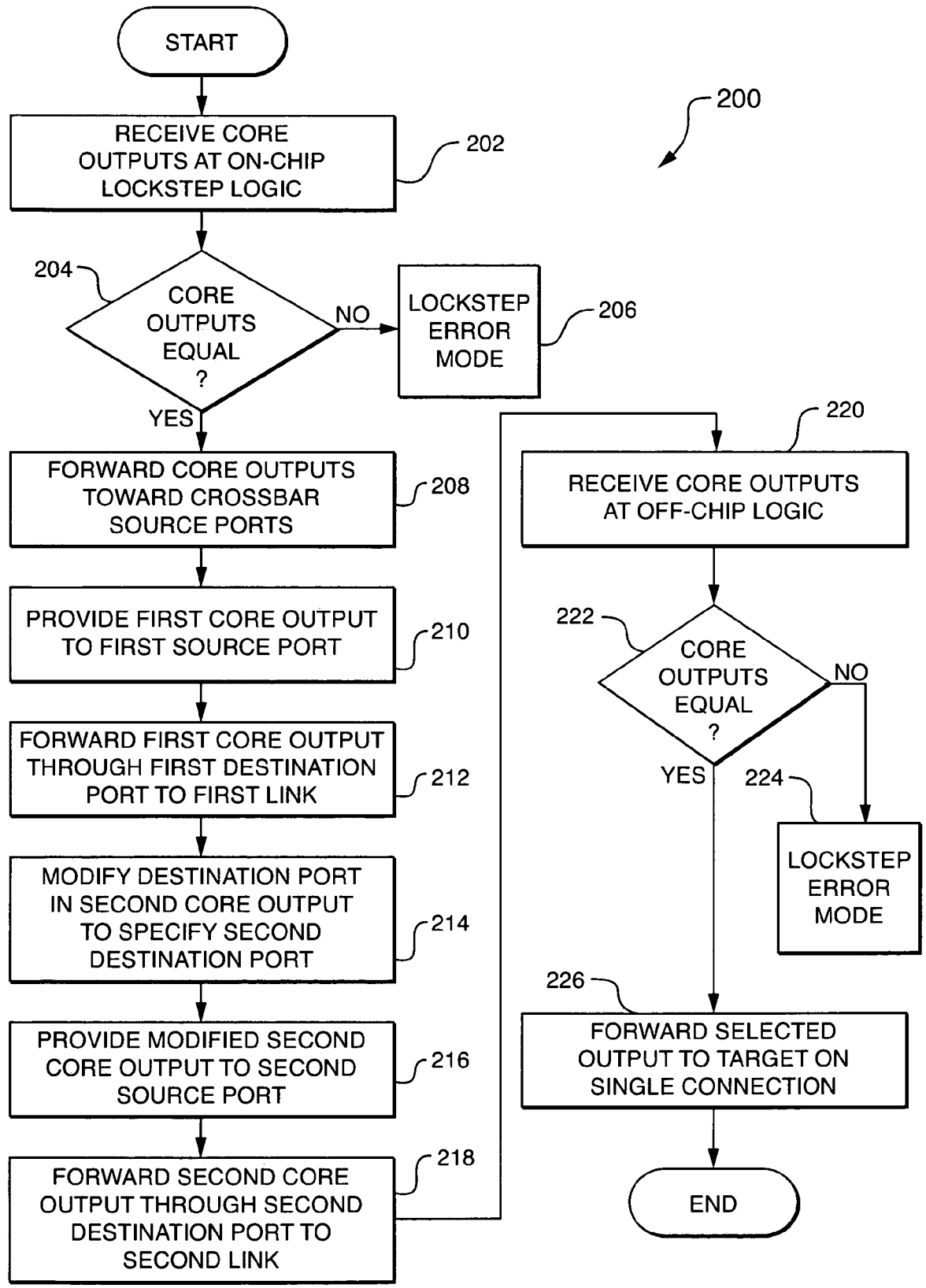
FIG. 2 is a flowchart of a method performed by the system of FIG. 1 according to one embodiment of the present invention.

Referring to FIG. 1, a block diagram is shown of a system 100 for operating multiple microprocessor cores 102a-b in lockstep according to one embodiment of the present invention. The cores 102a-b are components of a microprocessor 104, which may have additional cores (not shown in FIG. 1 for ease of illustration). Referring to FIG. 2, a flowchart is shown of a method that is performed by the system 100 of FIG. 1 according to one embodiment of the present invention.

The microprocessor 104 also includes an on-chip crossbar 108. As is well-known to those having ordinary skill in the art, a crossbar may include a plurality of source ports and a plurality of destination ports, and may establish a connection between any source port and any destination port. Furthermore, there may be any number of such connections active simultaneously within the crossbar. In the embodiment illustrated in FIG. 1, the crossbar 108 includes two source ports 126a-b and two destination ports 112a-b. Destination ports 112a-b are in turn connected to links 110a-b, which may be connected to external devices, such as memory controllers or other processors or processor cores (not shown). Additional ports and links are omitted from FIG. 1 for ease of illustration and explanation. Links 110a-b include both outbound transmission paths 136a-b and inbound transmission paths 138a-b, respectively.

When a component within the microprocessor 104 (such as one of the cores 102a-b) provides a packet to one of the source ports 126a-b for transmission over one of the links 110a-b, the packet includes a header which specifies the destination port (and thereby the target device) to which the packet is addressed. In response to receiving a packet at a source port, the crossbar 108 establishes an internal connection between the source port at which the packet is received and the specified destination port, and forwards the packet to the specified destination port. The packet is then transmitted over the corresponding one of the links 110a-b (on one of the outbound transmission paths 136a-b) to the specified target device.

The microprocessor 104 includes on-chip lockstep logic 106, which may perform lockstep checking on the outputs of the cores 102a-b. The system 100 may operate in either a lockstep mode, in which the lockstep logic 106 performs lockstep checking on the outputs of the cores 102a-b, or a non-lockstep mode, in which the cores 102a-b execute distinct instruction streams, unchecked by the lockstep logic 106. Examples of techniques that may be used by the lockstep logic 106 to operate in non-lockstep mode are described in the above-referenced patent application entitled "Core-Level Processor Lockstepping," and therefore will not be described in more detail herein.

Because the lockstep logic 106 performs lockstep checking on the outputs of the cores 102a-b before such outputs are provided to the crossbar 108, errors which are introduced at subsequent points in the core output data paths may remain undetected. For example, errors which are introduced in the crossbar 108 or the links 110a-b may remain undetected. To address this problem, examples of techniques will now be described for performing external lockstep checking on the outputs of the cores 102a-b.

Consider operation of the system 100 in lockstep mode. Cores 102a-b are coupled over lines 114a-b to lockstep logic 106. Cores 102a-b generate output, in the form of control/data signals transmitted on lines 114a-b. The lockstep logic 106 receives the outputs from the cores 102a-b (step 202). The lockstep logic 106 compares the outputs of the cores 102a-b to each other and determines whether they are equal to each other (step 204). If the signals are not equal to each other, the lockstep logic 106 enters a lockstep error mode in which the lockstep logic 106 may attempt to recover from the lockstep error and/or signal a fatal error (step 206). Examples of techniques that may be used by the lockstep logic 106 to operate in lockstep error mode are described in more detail in the above-referenced patent application entitled "Core-Level Processor Lockstepping."

If the core output signals are equal to each other, the lockstep logic 106 forwards the core output signals on lines 132a-b, respectively (step 208). Note, however, that since the cores 102a-b execute the same instruction stream when the system 100 is operating in lockstep mode, the packets transmitted by cores 102a-b on lines 132a-b will specify the same one of the destination ports 112a-b. If such output packets were simply retransmitted to source ports 126a-b of crossbar 108, the crossbar 108 would need to arbitrate between the outputs of the two cores 102a-b and transmit one packet sequentially after the other through the destination port 112a. As a result of such sequential transmission, the outputs of the cores 102a-b would fall out of sync with each other, potentially to an increasing degree over time. Such lack of synchrony may cause the lockstep logic 106 to signal a lockstep error even if the two cores 102a-b are producing output having the same content, simply because the outputs are shifted in time with respect to each other.

Instead, in the embodiment illustrated in FIG. 1, the microprocessor 104 includes port-changing logic 130 coupled between the lockstep logic 106 and source port 126b of crossbar 108. Assume for purposes of example that the outputs of both of the cores 102a-b specify the destination port 112a. If the lockstep logic 106 determines that the outputs of the cores 102a-b are equal to each other, the lockstep logic 106 retransmits the output of core 102a (received on line 114a) on line 132a to source port 126a (step 210). The output of core 102a is thereby transmitted to source port 126a and through the crossbar 108 to destination port 112a, and then over link 110a (step 212).

Similarly, the lockstep logic 106 forwards the output of core 102b (received on line 114b) on line 132b, where the output is received by port-changing logic 130. Port-changing logic 130 modifies the header in the packet it receives to specify a destination port other than port 112a (step 214). Assume for purposes of the following discussion that the port changing logic 130 changes the destination port to port 112b. The port-changing logic 130 transmits the modified output packet on line 134 to source port 126b (step 216) and through the crossbar 108 to destination port 112b, and then over link 110b (step 218).

In the embodiment illustrated in FIG. 1, packets received over the links 110a-b and forwarded to ports 126a-b are forwarded directly to the corresponding cores 102a-b, without the intervention of the lockstep logic 106. Lockstep checking need not be performed on these inbound paths because any lockstep mismatch between inputs provided to the cores 102a-b will eventually be propagated to the outputs of the cores 102a-b and will thereby be identified by the lockstep logic 106. Lockstep checking may, however be performed on inputs received over the links 110a-b, if desired.

As will now be described in more detail, transmission of the outputs of cores 102a-b over links 110a-b enables the outputs to be checked against each other again after they are transmitted off-chip over the links 110a-110b, thereby protecting against errors which may occur in the links 110a-b themselves. In the absence of such checking, it is possible that errors may be introduced between the lockstep logic 106 and the specified target devices.

Typically, the links 110a-b are coupled to another crossbar (not shown) or to some other portion of the system fabric. The system 100, however, includes link checking logic 140, located external to the microprocessor 104. Link checking logic 140 is coupled to links 110a-b, respectively. Because the outputs of cores 102a-b are transmitted on links 110a-b, respectively, when the system 100 is operating in lockstep mode, link checking logic 140 receives the outputs of cores 102a-b when the system 100 is operating in lockstep mode (step 220).

Link checking logic 140 may verify that the outputs of the cores 102*a-b* are equal to each other in the same or similar manner as the lockstep logic 106 (step 222). Unlike the lockstep logic 106, however, the link checking logic 140 is located external to the microprocessor 104 and may, for example, be located on a separate chip. The link checking logic 140 may, therefore, identify lockstep errors which were not present, and therefore not detectable, at the point of the lockstep logic 106, but which were introduced after the lockstep logic 106 (e.g., in the crossbar 108 or the links 110*a-b*).

If the link checking logic 140 determines that the core outputs received on links 110*a-b* are equal to each other, the link checking logic 140 transmits one of the core outputs on connection 142 to the specified target device (step 226). The connection 142 may, for example, be another link coupled to another crossbar (not shown), through which the core output may be transmitted to the target device.

If the link checking logic 140 determines that the core outputs receive on links 110*a-b* are not equal to each other, the link checking logic 140 may take any appropriate action in response, such as attempting to recover from the error or signaling a lockstep error to the lockstep logic 106 (step 224). Examples of techniques which may be used to attempt to recover from a lockstep error are disclosed in more detail in the above-referenced patent application entitled, "Core-Level Lockstep Processor Lockstepping."

In the embodiment illustrated in FIG. 1, when an inbound packet is received by the link-checking logic 140 over connection 142, the link-checking logic 140 duplicates the packet and transmits it over both of the inbound transmission paths 138*a-b*. The inbound packets thereby transmitted to crossbar ports 112*a-b* may then be forwarded by the crossbar port 108 to the cores 102*a-b* over lines 118*a-b* using conventional techniques.

By transmitting the output of the cores 102*a-b* on the single connection 142, and by duplicating incoming packets on connection 142 to both of the cores 102*a-b*, the link-checking logic 140 enables external devices to communicate with the cores 102*a-b* over the single connection 142, as if the cores 102*a-b* were a single processor core. The link-checking logic 140 thereby provides off-chip lockstep checking, while allowing external devices to continue to communicate with the microprocessor 104 as if it contains a single processor core.

Note that the system 100 of FIG. 1 may be modified to operate in a non-lockstep mode of operation. For example, the link-checking logic 140 may include an additional external connection (not shown), similar to the connection 142. When the system 100 operates in non-lockstep mode, the link-checking logic 140 may relay incoming and outgoing packets between links 110*a-b* and the two external connections, without performing lockstep checking. The cores 102*a-b* may, therefore, communicate independently with external devices when the system 100 is operating in non-lockstep mode. Those having ordinary skill in the art will appreciate how to perform this and other modifications to enable the system 100 to operate in a non-lockstep mode of operation.

The link-checking logic 140 may perform functions other than performing lockstep checking. More generally, for example, the link checking logic 140 may serve as an interface between the microprocessor 104 and external components. It may, for example, translate output receive on transmission paths 136*a-b* from the internal protocol used on the links 110*a-b* into an external protocol suitable for communication with external components, such as a networking protocol such as TCP/IP.

The description above states that outputs of the cores 102*a-b* are processed by the lockstep logic 106 and forwarded over links 110*a-b* to link checking logic 140. Not all outputs of the cores 102*a-b*, however, need be transmitted over links 110*a-b*. For example, memory access requests may be provided to memory controllers (not shown) without transmitting such requests over the links 110*a-b*. The memory controllers, which may include both on-chip and off-chip memory controllers, may process such requests using techniques that are well-known to those having ordinary skill in the art. In such an embodiment, requests other than memory access requests (such as I/O requests) may be transmitted over links 110*a-b* and processed by the link-checking logic in the manner described above.

Figure 3:
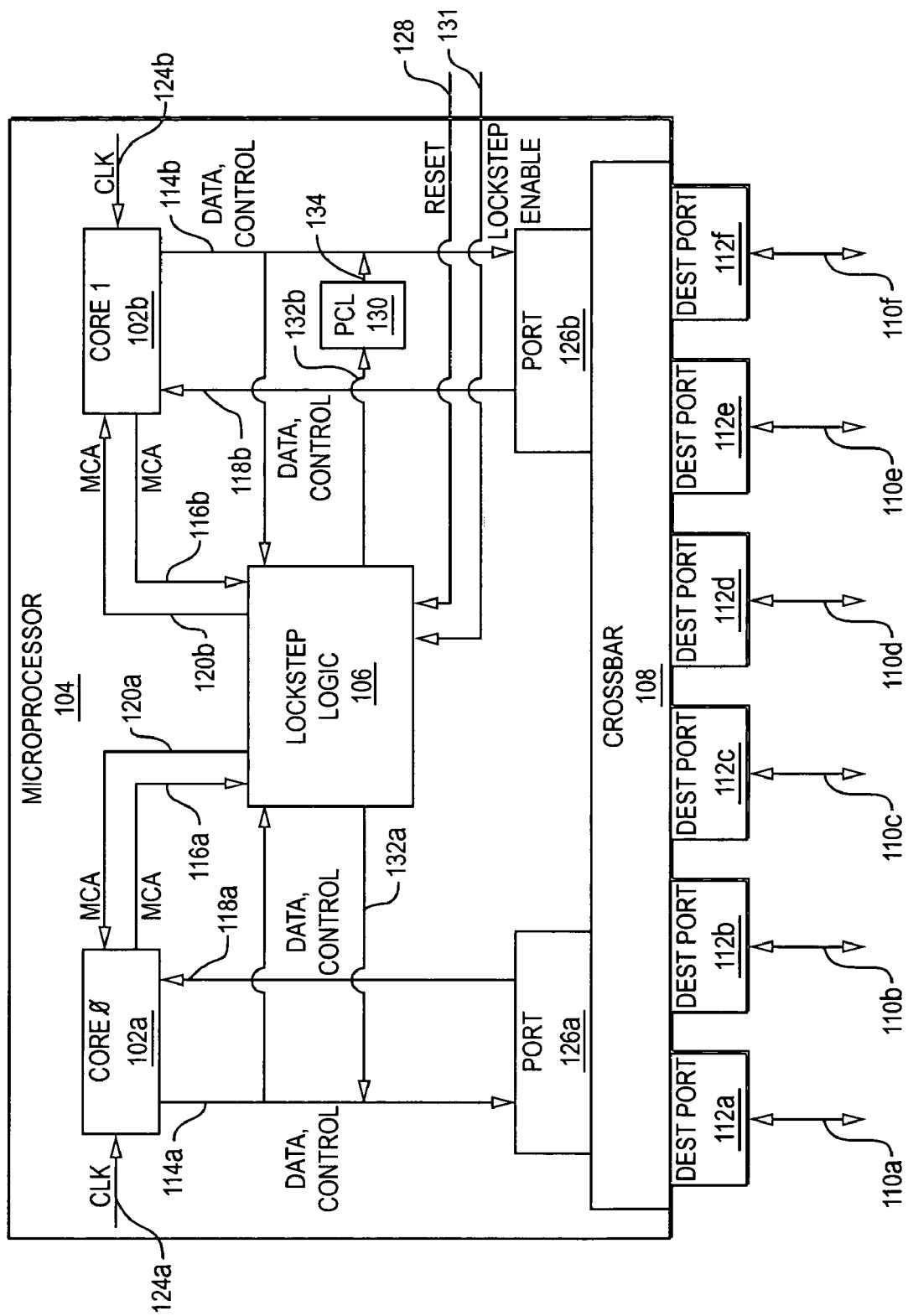
FIG. 3 is a block diagram illustrating the microprocessor of FIG. 1 in more detail according to one embodiment of the present invention.

Having described the operation of the system 100 in general, the system 100 will now be described in further detail according to various embodiments of the present invention. Referring to FIG. 3, a block diagram is shown illustrating the microprocessor 104 of FIG. 1 in more detail according to one embodiment of the present invention.

As stated above, the system 100 may operate in either a lockstep mode or a non-lockstep mode. In the embodiment illustrated in FIG. 3, core output lines 114*a-b* are coupled both to lockstep logic 106 (as in FIG. 1) and to ports 126*a-b*, respectively. When the system 100 is operating in non-lockstep mode, core 102*a* outputs data/control signals directly to port 126*a* on line 114*a* and receives data signals directly from port 126*a* on line 118*a*. Similarly, when the system 100 is operating in non-lockstep mode, core 102*b* outputs data/control signals directly to port 126*b* on line 114*b* and receives data signals directly from port 126*b* on line 118*b*.

A lockstep enable signal transmitted on line 131 controls whether the lockstep logic 106 operates in lockstep mode or non-lockstep mode. More specifically, the lockstep logic 106 operates in lockstep mode when a lockstep enable signal is asserted on line 131 and a reset signal on line 128 is de-asserted. Otherwise, the lockstep logic 106 operates in non-lockstep mode. The lockstep enable line 131 may be coupled to configuration management circuitry or to any other circuitry for controlling whether the lockstep logic 106 is to operate in lockstep mode. Examples of techniques which may be used by the lockstep logic 106 to operate in either lockstep mode or non-lockstep mode are disclosed in the above-referenced patent application entitled "Core-Level Processor Lockstepping."

In the embodiment illustrated in FIG. 3, lockstep logic 106 is connected to ports 126*a-b* indirectly through the pre-existing connections 114*a-b* between cores 102*a-b* and ports 126*a-b*. The lockstep logic 106 may perform lockstep checking on the core outputs received in lines 114*a-b* and then retransmit the outputs back to lines 114*a-b* over lines 132*a-b* if no lockstep error is detected. The above-referenced patent application entitled "Core-Level Processor Lockstepping" provides examples of circuitry which may be used to implement the lockstep logic 106 to perform this function.

In the embodiment illustrated in FIG. 3, the output produced by the lockstep logic 106 on line 132*b* is received by the port changing logic 130, which changes the destination port of the output of the core 102*b* in the manner described above, and then transmits the modified output over line 134 to line 114*b*. The original output provided by the core 102*b* on line 114*b* may thereby be overridden with the output produced by the port changing logic 130.

Each of the cores 102a-b may also include error-checking circuitry. If error-checking circuitry in one of the cores 102a-b detects an internal error, the core may transmit an error signal on the corresponding one of machine check architecture (MCA) lines 116a-b. In response, the lockstep logic 106 may operate in an "unprotected mode" in which the lockstep logic 106 forwards only the output of the non-error producing core to the crossbar 108, and attempts to recover from the error. Examples of techniques that may be used by the lockstep logic 106 to operate in "unprotected mode" are described in more detail in the above-referenced patent application entitled "Core-Level Processor Lockstepping." The lockstep logic 106 may also transmit error-related signals and other control signals to the cores 102a-b on MCA lines 120a-b, respectively.

As shown in FIG. 3, the crossbar 108 may include ports 112c-f, with corresponding links 110c-f, in addition to the ports 112a-b and links 110a-b shown in FIG. 1. The port-changing logic 130 may change the destination port of packets transmitted by the core 102b to specify any of the destination ports 112b-f (assuming that outputs of core 102a are transmitted through port 112a). Link-checking logic 140 may, therefore, be coupled to any or all of the destination ports 112a-f. Link-checking logic 140 may, however, be configured to check only those links over which output from the cores 102a-b are transmitted.

In the embodiment illustrated in FIG. 1, the lockstep logic 106 is coupled to crossbar ports 126a-b and forwards the outputs from cores 102a-b to the crossbar ports 126a-b. In the embodiment illustrated in FIG. 3, the lockstep logic 106 is also coupled to crossbar ports 126a-b, albeit somewhat more indirectly via the output lines 114a-b. In yet another embodiment illustrated in FIG. 4A, a microprocessor 404 is shown according to an embodiment of the present invention in which lockstep logic 406 is coupled to crossbar ports 426a-b indirectly through cores 402a-b. As will now be described in more detail, the lockstep logic 406 may perform the same or similar functions indirectly through cores 402a-b as the lockstep logic 106 performs directly in the embodiments illustrated in FIGS. 1 and 3. Features of the cores 402a-b and lockstep logic 406 which are not illustrated in FIG. 4A may be implemented in the same manner as corresponding features of the cores 102a-b and lockstep logic 106, respectively (FIGS. 1 and 3).

Figure 4A:
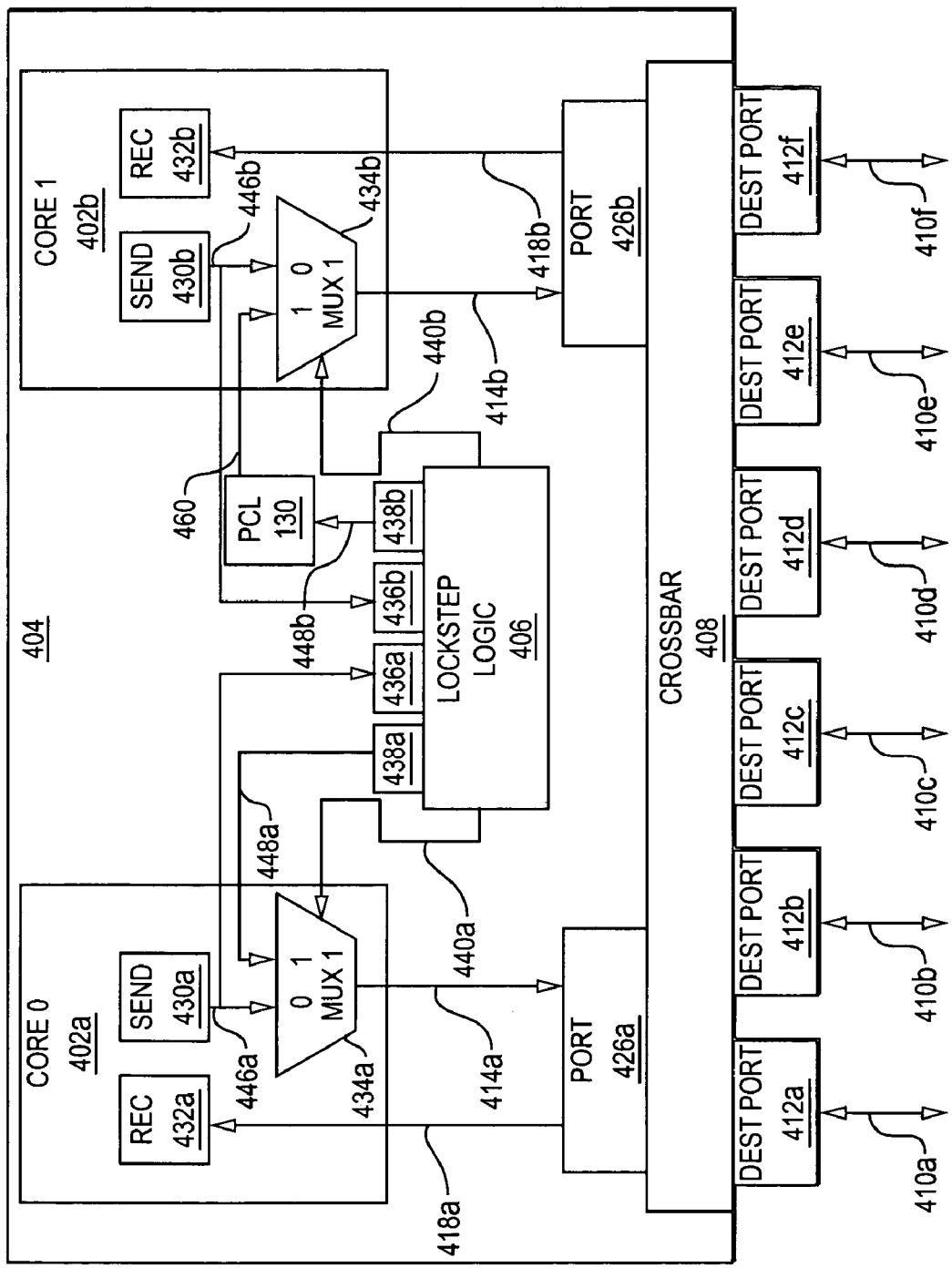
FIG. 4A is a block diagram illustrating the microprocessor of FIG. 1 according to one embodiment of the present invention.

The embodiment illustrated in FIG. 4A may be particularly useful for adding the lockstep logic 406 to an existing design in which cores 402a-b are already coupled to crossbar ports 426a-b, respectively. The lockstep logic 406 may be inserted into such a design, in the manner illustrated in FIG. 4A, without the need to decouple cores 402a-b from ports 426a-b and without the need to allocate an additional crossbar port to the lockstep logic 406. The particular implementation illustrated in FIG. 4A is merely an example of a way in which the techniques disclosed herein may be applied to lockstep checking which reuses existing crossbar ports. Those having ordinary skill in the art will appreciate, for example, how to apply the techniques illustrated in FIG. 4A to embodiments illustrated in FIGS. 4A-4B of the above-referenced patent application entitled "Core-Level Processor Lockstepping."

Cores 402a-b include send logic 430a-b for transmitting data/control signals to ports 426a-b on lines 414a-b, respectively. Cores 402a-b also include receive logic 432a-b for receiving data signals from ports 426a-b on lines 418a-b, respectively. Techniques for implementing send logic 430a-b and receive logic 432a-b are well-known to those having ordinary skill in the art.

As in the embodiments illustrated in FIGS. 1 and 3, incoming communications received at the crossbar ports 426a-b are provided directly to the receive logic 432a-b without the intervention of the lockstep logic 406, whether or not the microprocessor 404 is operating in lockstep mode. As described above, such incoming communications may alternatively be provided to the lockstep logic 406 for lockstep checking before being forwarded to the receive logic 432a-b when the microprocessor 404 is operating in lockstep mode.

Now consider outbound communications transmitted by send logic on lines 446a-b. Note that cores 402a-b include multiplexers 434a-b, which are coupled to send logic 430a-b, respectively. When the lockstep logic 406 is in non-lockstep mode, the outputs of send logic 430a-b (on lines 446a-b) pass through to lines 414a-b, respectively. This result is achieved by the lockstep logic 406 transmitting selection signals to multiplexers 434a-b on lines 440a-b, respectively, which select the outputs of send logic 430a-b (on lines 446a-b) for output on lines 414a-b, respectively, when the microprocessor 404 is operating in non-lockstep mode.

The outputs of send logic 430a-b are coupled to inputs 436a-b, respectively, of lockstep logic 406. Upon receiving the outputs of send logic 430a-b in this way, lockstep logic 406 performs lockstep checking on the outputs in the manner described above if the microprocessor 404 is operating in lockstep mode. If no lockstep error is detected, lockstep logic 406 retransmits the output of send logic 430a on line 448a, and retransmits the output of send logic 430b on line 448b.

When in lockstep mode, the lockstep logic 406 transmits selection signals on lines 440a-b to multiplexers 434a-b which select the multiplexer inputs labeled "1" in FIG. 4A. As a result, the retransmitted core output provided by lockstep logic 406 on line 448a is transmitted by multiplexer 434a on line 414a to crossbar port 426a.

The retransmitted core output provided by lockstep logic 406 on line 448b, however, is intercepted by port-changing logic 130, which modifies the destination port of packets transmitted on line 448b to specify a port other than that which was originally specified. If, for example, the original outputs of cores 402a-b both specified destination port 412a, the port-changing logic 130 may modify the destination port specified by packets transmitted on line 448b to destination port 412b.

Port-changing logic 130 transmits the modified packets on line 460 to the "1" input of multiplexer 434b, which forwards the modified packets on line 414b to port 426b. The modified packets are then transmitted through the crossbar 408 to the specified destination port (e.g., port 412b).

Among the advantages of the invention are one or more of the following. In the absence of the link-checking logic 140 or other lockstep boundary below the crossbar 108, errors introduced by the crossbar 108 and/or links 110a-f may remain undetected and uncorrected. The link-checking logic 140, therefore, advantageously provides a lockstep boundary below the crossbar 108, thereby enabling the detection and correction of lockstep errors introduced by the crossbar 108 and/or links 110a-b.

Furthermore, techniques disclosed herein enable lockstep checking to be performed on output streams produced by multiple cores 102a-b in a single IC package. By performing lockstep checking on processing units in a single socket, such techniques avoid problems typically associated with systems employing socket-level lockstepping, in which processors in separate sockets are operated in lockstep with each other. In such systems it can be extremely difficult to operate both processors in lockstep with each other over extended periods of time due to the difficulty of providing synchronized clocks to both processors. In contrast, in a system such as that illustrated in FIG. 1, both of the cores 102a-b, as well as the lockstep logic 106, crossbar 108, and links 110a-b, may be driven by the same clock, thereby avoiding the timing problems typically associated with socket-level lockstepping without sacrificing reliability.

A further advantage of techniques disclosed herein is that they may be implemented without modifying the processor cores 102a-b. Rather, as should be apparent from the description herein, the cores 102a-b may operate in the same manner as conventional processor cores. Lockstep checking is performed by the lockstep logic 106 and/or the link-checking logic 140, without the need for modifications to the cores 102a-b. Furthermore, the port-checking logic 130 may be implemented external to the cores 102a-b, thereby further avoiding the need to modify the cores. The ability to implement lockstepping in the manner disclosed herein without modifying the cores 102a-b may simplify the design of the system 100 significantly due to the relative complexity of the cores 102a-b. Furthermore, the techniques disclosed herein may be used in conjunction with any kind of processor core due to the independence of the lockstepping circuitry from the implementation of the processor cores 102a-b.

In the embodiment illustrated in FIG. 1, lockstep checking may be performed by the lockstep logic 106, the link-checking logic 140, or both. Although lockstep checking may be performed only by the link checking logic 140, the use of the lockstep logic 106 may be advantageous because it may enable lockstep errors which occur prior to the lockstep logic 106 to be detected earlier than if their detection were deferred to the link checking logic 140. As a result, such errors may be corrected earlier than if only the link checking logic 140 were employed. It may, however, be desirable to eliminate the lockstep logic 106 and to use the link checking logic 140 for various reasons, such as considerations of cost, area, and/or speed.

In general, the use of the crossbar 108 rather than a shared system bus may be advantageous for a variety of reasons. For example, shared system buses typically have a large number of external pins, often numbering in the hundreds, to which components (such as lockstepping circuitry) must be coupled. Designing and implementing the wiring for such circuitry can be time-consuming and costly. The crossbar ports 126a-b, in contrast, may have relatively small numbers of bits (e.g., 32 for data and 10 for control), thereby simplifying the design and implemented of wiring for coupling the cores 102a-b and/or the lockstep logic 106 to the ports 126a-b.

Furthermore, the embodiment illustrated in FIG. 4A enables existing connections between the cores 402a-b and the crossbar ports 426a-b to be reused. In such an implementation, while in lockstep mode the lockstep logic 406 communicates with the crossbar 408 through an existing port coupled to one of the cores 402a-b. When the lockstep logic 406 is in non-lockstep mode, the cores 402a-b may continue to communicate directly with their respectively crossbar ports 426a-b without interference by the lockstep logic 406. Such a design may, therefore, simplify the process of adding the lockstep logic 406 to an existing implementation which includes the cores 402a-b coupled to the crossbar 408.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although six links are shown in FIGS. 3 and 4, the crossbars 108 and 408 may have any number of links. Such links may be asynchronous with respect to the cores; i.e., the links and cores may operate at different clock frequencies with respect to each other. Furthermore, the links may be asynchronous with respect to each other. Although the lockstep logic and crossbar in FIGS. 3 and 4 are on the same chip as the corresponding cores, this is not a requirement of the present invention.

Although in the embodiment illustrated in FIG. 4A, the output signals produced by the send logic 430a-b are transmitted in their entirety to the lockstep logic 406 and back to the send logic 430a-b, this is not a requirement of the present invention. For example, referring to FIG. 4B, a schematic diagram is shown of circuitry that may be used in the core 402a as an alternative to the multiplexer 434a. Recall that in the embodiment illustrated in FIG. 4A, all of the data transmitted by the core 402a to input 436a of the lockstep logic 406 may be transmitted back to the core by the lockstep logic 406 on line 448a. As will now be described in more detail., in the embodiment illustrated in FIG. 4B, the lockstep logic 406 transmits fewer than the original number of bits back to the core 402a, thereby simplifying the wiring of the circuit. The same circuitry may be implemented in the other core 402b to achieve an additional benefit.

The send logic 430a transmits an n-bit output on lines 446a. The entire n-bit output is transmitted on lines 452 to lockstep logic input 436a. Within the core 402a, however, the n-bit output is split into an m-bit signal on lines 454 (where m<n) and an (n–m)-bit signal on lines 456. The m-bit signal on lines 454 may include certain critical control bits, such as the "valid," "poison," and "viral" bits that are commonly used in microprocessors. As described in more detail in the above-referenced patent application entitled "Lockstep Error Signaling," one or more of such bits may be set to signal that a lockstep error or other error has occurred. Note, however, that the m-bit signal may include any number of bits whose values may be modified by the lockstep logic 406 for signaling errors or performing other functions. The (n–m)-bit signal on lines 456 may include the remaining bits from the original n-bit signal on lines 446a.

Figure 4B:
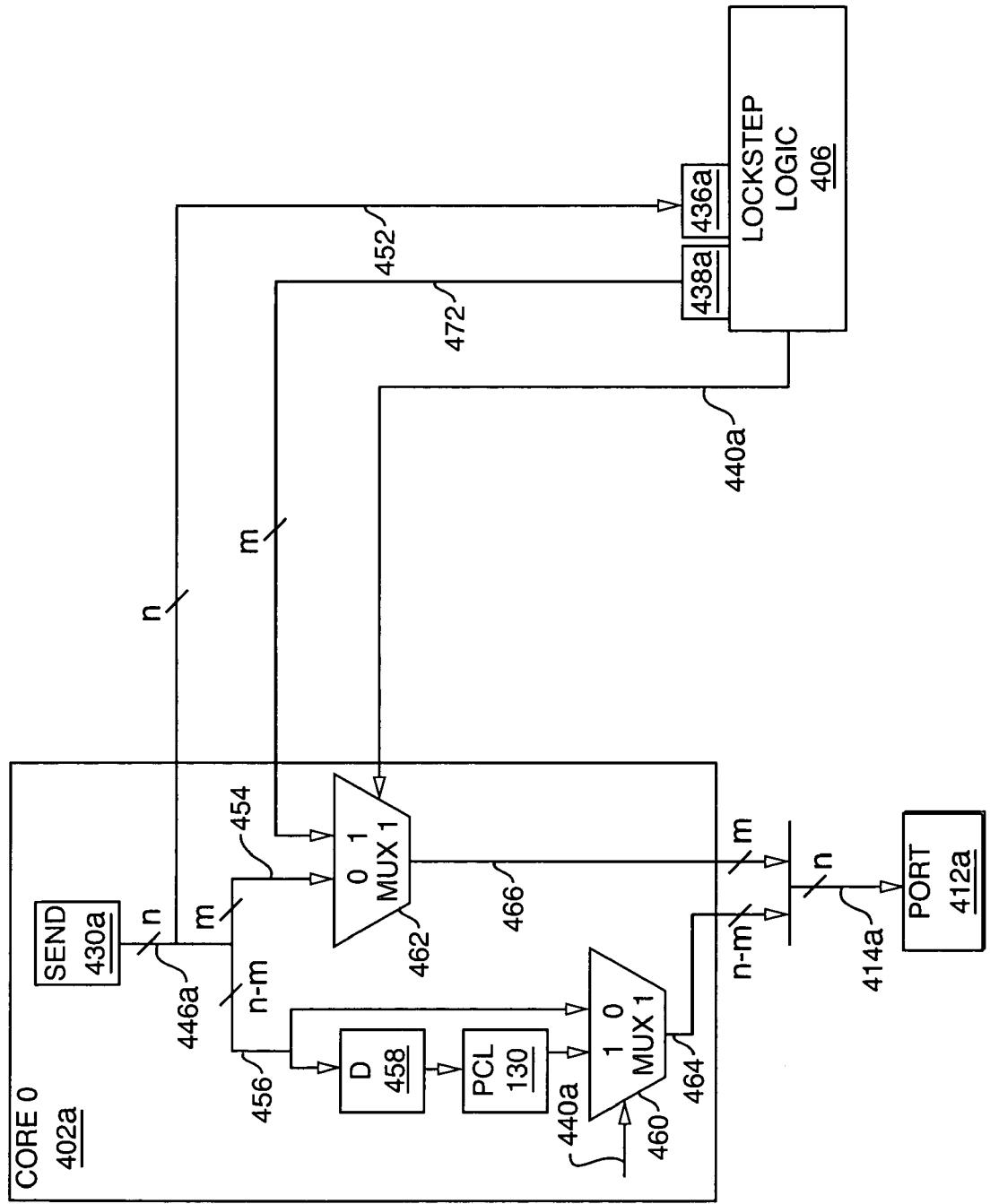
FIG. 4B is a schematic diagram of an alternative embodiment of the core circuitry illustrated in FIG. 4A.

Consider first the operation of the circuitry illustrated in FIG. 4B when the lockstep logic 106 operates in non-lockstep mode. When in non-lockstep mode, the lockstep logic 406 transmits a zero value on the lockstep select line 440a, which is provided as an input to multiplexers 460 and 462. In response, multiplexer 460 selects the (n–m)-bit signal on lines 456 for output on lines 464, and multiplexer 462 selects the m-bit signal on lines 454 for output on lines 466. The signals on lines 464 and 466 are combined into the original n-bit signal on lines 414a and then provided to crossbar port 412a. In summary, in non-lockstep mode the n-bit signal output by the send logic 430a is provided to the crossbar port 412a.

Consider now the operation of the circuitry illustrated in FIG. 4B when the lockstep logic 406 operates in lockstep mode and therefore outputs the value 1 on lockstep select line 440a. Lockstep logic 406 outputs an m-bit signal on lines 472 which contains the same bit fields (e.g., valid, poison, and viral) as the m-bit signal on lines 454. The values of the m-bit signals on lines 454 and 472 may differ, however, since the m-bit signal on lines 472 may have been obtained from core 402*b* if core 402*b* is the master core. The values of the m-bit signals on lines 454 and 472 may also differ if, for example, the lockstep logic 406 has detected a lockstep error and signaled the error in the m-bit signal on lines 472, as described in more detail in the above-referenced patent application entitled "Lockstep Error Signaling." In response to receiving the 1-value selection signal on line 440*a*, the multiplexer 462 outputs the m-bit signal from lines 472 on lines 466.

The (n–m)-bit signal on lines 456 is provided to a delay circuit 458 (such as one or more staging latches), which provides a delayed version of the (n–m)-bit signal to port-changing logic 130. Note that although port-changing logic 130 is shown within core 402*a* in FIG. 4B, port-changing logic 134 may alternatively be provided within core 402*b*.

The port-changing logic 130 modifies the destination port specified in the (n–m)-bit signal and provides the modified (n–m)-bit signal to the multiplexer 460. The delay introduced by the delay circuit 458 is calibrated so that the total delay introduced by the delay circuit 458 and the port-changing logic 130 is substantially equal to the delay between the m-bit signals on lines 454 and 472 (introduced by the lockstep logic 406). In response to receiving the 1-value selection signal on line 440*a*, the multiplexer 460 outputs the delayed and modified (n–m)-bit signal on lines 464. The signals on lines 464 and 466 are combined into an n-bit signal on lines 414*a* and then provided to crossbar port 412*a*.

In summary, in lockstep mode the n-bit signal output by the send logic 430*a* is split into an (n–m)-bit signal and an m-bit signal. The (n–m)-bit signal is delayed, and the destination port specified in the delayed signal is modified to specify a destination port other than that which was originally specified. The m-bit signal is provided to the lockstep logic 406, which processes the m-bit signal and provides a return m-bit signal. The resulting (n–m)-bit signal and m-bit signal are recombined and provided to the crossbar port 412*a*, which forwards the signal (e.g., in the form of a packet) to the destination port indicated by the port-changing logic 130. The need for the lockstep logic 406 to transmit an entire n-bit signal to the core 402*a* is thereby eliminated, as is the corresponding wiring. FIG. 4B further illustrates that the port-changing logic 130 need not operate on a signal which passes through the lockstep logic 406.

Although crossbars are shown in FIGS. 1, 3, and 4, a crossbar is merely one example of a switching fabric (also referred to as a system fabric) which includes a plurality of input ports and a plurality of output ports, and which is capable of creating arbitrary point-to-point links between input-output port pairs. Switching fabrics other than crossbar ports may be used in conjunction with embodiments of the present invention.

Although the examples above include processor cores 102*a-b* operating in lockstep, the same techniques may be applied to processors or other circuitry operating in lockstep. The processor cores 102*a-b*, therefore, may therefore be characterized more generally as processing units.

Although various connections in the embodiments illustrated herein (such as lines 114*a-b*, 116*a-b*, and 118*a-b*) may be described above as individual lines, each such connection may include any number of lines, as may be necessary or desirable to carry associated signals. Furthermore, such connections may transmit signals serially or in parallel, using any communications protocol.

Components of the present invention, such as the lockstep logic 106, the port-changing logic 130, and the link-checking logic 140 may be implemented in custom-designed analog or digital circuitry, application-specific integrated circuits (ASICs), field-programmable gate arrays (FPGAs), computer hardware, software, or firmware, or any combination thereof.

Although the port-changing logic 130 is shown at particular locations in the drawings, the port-changing logic 130 may be provided at other locations in other embodiments of the present invention. For example, the port-changing logic 130 may be integrated into the lockstep logic 106 or either or both of the cores 102*a-b*.

What is claimed is:

1. A system comprising:
    a microprocessor comprising a first processing unit to generate a first output signal, a second processing unit to generate a second output signal, and lockstep logic comprising inputs coupled to the first and second processing units to detect whether the first output signal differs from the second output signal; and
    comparison means, coupled to the microprocessor, to detect whether the first output signal differs from the second output signal.

2. The system of claim 1, wherein the first processing unit comprises a first microprocessor core and wherein the second processing unit comprises a second microprocessor core.

3. The system of claim 1, wherein the microprocessor is installed in a socket, and wherein the comparison means is not installed in the socket.

4. The system of claim 1, wherein the microprocessor further comprises:
    a switching fabric to transmit the first and second output signals to the comparison means.

5. The system of claim 4, wherein the switching fabric comprises a crossbar.

6. The system of claim 4, wherein the switching fabric comprises a first source port to receive the first output signal, a second source port to receive the second output signal, wherein the first source port operates at a first frequency and wherein the second source port operates at a second frequency that differs from the first frequency.

7. The system of claim 6, wherein the first processing unit is clocked by a first clock having a third frequency that differs from the first frequency.

8. The system of claim 4, further comprising port-changing means for receiving the second output signal and modifying a destination specified therein to produce a modified second output signal, and wherein the switching fabric comprises a first source port to receive the first output signal and a second source port to receive the modified second output signal.

9. The system of claim 8, wherein the switching fabric further comprises a first destination port and a second destination port, wherein the first output signal specifies the first destination port as a destination, wherein the second output signal specifies the first destination port as a destination, and wherein the modified second output signal specifies the second destination port as a destination.

10. A system comprising:
    a microprocessor, installed in a socket, comprising a first microprocessor core to generate a first output signal and a second microprocessor core to generate a second output signal;

lockstep logic comprising inputs coupled to the first and second microprocessor cores, to detect whether the first output signal differs from the second output signal;

comparison means, coupled to the microprocessor and not installed in the socket, to detect whether the first output signal differs from the second output signal;

a crossbar to transmit the first and second output signals to the comparison means; and port-changing means for receiving the second output signal and modifying a destination specified therein to produce a modified second output signal, wherein the crossbar comprises a first source port to receive the first output signal and a second source port to receive the modified second output signal.

11. A method comprising steps of:
(A) in a first processing unit of a microprocessor, generating a first output signal;
(B) in a second processing unit of the microprocessor, generating a second output signal;
(C) providing the first and second output signals to comparison means located external to the microprocessor;
(D) at the comparison means, detecting whether the first output signal differs from the second output signal;
(E) prior to step (C), providing the first and second output signals to lockstep logic in the microprocessor; and
(F) at the lockstep logic, detecting whether the first output signal differs from the second output signal.

12. The method of claim 11, wherein the first processing unit comprises a first microprocessor core and wherein the second processing unit comprises a second microprocessor core.

13. The method of claim 11, further comprising steps of:
(G) after step (F), modifying a destination specified by the second output signal; and
(H) transmitting the second output signal to the modified destination.

14. The method of claim 11, further comprising a step of:
(E) prior to step (C), modifying a destination of the second output signal.

15. A method comprising steps of:
(A) in a first core of a microprocessor, generating a first output signal;
(B) in a second core of the microprocessor, generating a second output signal;
(C) providing the first and second output signals to comparison means located external to the microprocessor;
(D) at the comparison means, detecting whether the first output signal differs from the second output signal;
(E) prior to step (C), providing the first and second output signals to lockstep logic in the microprocessor;
(F) at the lockstep logic, detecting whether the first output signal differs from the second output signal;
(G) after step (F), modifying a destination specified by the second output signal; and
(H) transmitting the second output signal to the modified destination.

16. An integrated circuit comprising:
a first processing unit to generate a first output signal specifying a first destination;
a second processing unit to generate a second output signal specifying the first destination;
lockstep logic coupled to the first and second processing units to detect whether the first output signal differs from the second output signal;
port-changing means for modifying the second output signal to specify a second destination;
first means for providing the first output signal to the first destination; and
second means for providing the second output signal to the second destination.

17. The integrated circuit of claim 16, further comprising:
a switching fabric comprising the first means for providing and the second means for providing.

18. The integrated circuit of claim 17, wherein the switching fabric comprises a first destination port and a second destination port, wherein the first destination comprises the first destination port and wherein the second destination comprises the second destination port.

19. The integrated circuit of claim 17, wherein the switching fabric comprises a crossbar.

20. The integrated circuit of claim 17, wherein the first means for providing comprises a first source port to receive the first output signal and a second source port to receive the second output signal, wherein the first source port operates at a first frequency and wherein the second source port operates a second frequency that differs from the first frequency.

21. The integrated circuit of claim 20, wherein the first processing unit is clocked by a first clock having a third frequency that differs from the first frequency.

22. The integrated circuit of claim 16, wherein the first processing unit comprises a first microprocessor core and wherein the second processing unit comprises a second microprocessor core.

23. An integrated circuit comprising:
a first processing unit to generate a first output signal specifying a first destination port;
a second processing unit to generate a second output signal specifying the first destination port;
lockstep logic coupled to the first and second processing units to detect whether the first output signal differs from the second output signal;
port-changing means for modifying the second output signal to specify a second destination; and
a crossbar comprising:
the first destination port;
the second destination port; and
first means for providing the first output signal to the first destination port and second means for providing the second output signal to the second destination port.

24. A method comprising steps of:
(A) receiving a first output signal from a first microprocessor core in a microprocessor;
(B) receiving a second output signal from a second microprocessor core in the microprocessor;
(C) determining whether the first output signal differs from the second output signal;
(D) transmitting the first output signal to a first source port of a system fabric;
(E) identifying a first destination port specified by the second output signal;
(F) modifying the second output signal to specify a second destination port that differs from the first destination port; and
(G) transmitting the modified second output signal to a second source port of the system fabric.

25. The method of claim 24, further comprising steps of:
(H) at the system fabric, transmitting the first output signal to the first destination port; and (I) at the system fabric, transmitting the modified second output signal to the second destination port.

26. The method of claim 24, further comprising steps of:
(H) receiving the first output signal and the modified second output signal at comparison means located external to the microprocessor; and
(I) at the comparison means, determining whether the first output signal differs from the modified second output signal.

27. The method of claim 24, wherein the switching fabric comprises a crossbar port.

28. The method of claim 24, wherein the first source port operates at a first frequency that differs from a second frequency at which the second source port operates.

29. The method of claim 24, wherein the first microprocessor core is clocked by a first clock having a first frequency and wherein the first source port operates at a second frequency which differs from the first frequency.

30. The method of claim 24, wherein the microprocessor comprises lockstep logic, and wherein steps (A)-(C) are performed by the lockstep logic.

31. A method comprising steps of:
(A) in a microprocessor, receiving a first output signal from a first core of the microprocessor;
(B) in the microprocessor, receiving a second output signal from a second core of the microprocessor;
(C) in the microprocessor, determining whether the first output signal differs from the second output signal;
(D) transmitting the first output signal to a first source port of a crossbar;
(E) identifying a first destination port specified by the second output signal;
(F) modifying the second output signal to specify a second destination port that differs from the first destination port;
(G) transmitting the modified second output signal to a second source port of the crossbar;
(H) at the crossbar, transmitting the first output signal to the first destination port;
(I) at the crossbar, transmitting the modified second output signal to the second destination port;
(J) receiving the first output signal and the modified second output signal at comparison means located external to the microprocessor; and
at the comparison means, determining whether the first output signal differs from the modified second output signal.

32. A system comprising:
a microprocessor comprising a first processing unit to generate a first output signal, a second processing unit to generate a second output signal, and a switching fabric to transmit the first and second output signals to the comparison means, the switching fabric comprising a first source port to receive the first output signal and a second source port to receive the second output signal, wherein the first source port operates at a first frequency and wherein the second source port operates at a second frequency that differs from the first frequency; and
comparison means, coupled to the microprocessor, to detect whether the first output signal differs from the second output signal.

33. A method comprising steps of:
(A) in a first processing unit of a microprocessor, generating a first output signal;
(B) in a second processing unit of the microprocessor, generating a second output signal;
(C) providing the first and second output signals to comparison means located external to the microprocessor;
(D) at the comparison means, detecting whether the first output signal differs from the second output signal; and
(E) prior to step (C), modifying a destination of the second output signal.

* * * * *